(12) United States Patent
Ishii et al.

(10) Patent No.: US 10,119,568 B2
(45) Date of Patent: Nov. 6, 2018

(54) ROLLING BEARING

(71) Applicant: JTEKT CORPORATION, Osaka-shi, Osaka (JP)

(72) Inventors: Yasuhiko Ishii, Kashiwara (JP); Yuu Yasuda, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/783,437

(22) Filed: Oct. 13, 2017

(65) Prior Publication Data

US 2018/0112715 A1    Apr. 26, 2018

(30) Foreign Application Priority Data

Oct. 21, 2016  (JP) ................................ 2016-206767

(51) Int. Cl.
*F16C 33/58* (2006.01)
*F16C 19/22* (2006.01)
*F16C 33/32* (2006.01)

(52) U.S. Cl.
CPC ............ *F16C 33/585* (2013.01); *F16C 19/22* (2013.01); *F16C 33/32* (2013.01)

(58) Field of Classification Search
CPC ............................. F16C 33/583; F16C 33/586
See application file for complete search history.

(56) References Cited

U.S. PATENT DOCUMENTS

| | | | | |
|---|---|---|---|---|
| 3,276,828 A | * | 10/1966 | Mansfield | F16C 35/063 384/585 |
| 3,588,205 A | * | 6/1971 | Daugherty | F16C 27/04 384/473 |
| 3,619,017 A | * | 11/1971 | Robinson | F16C 19/163 384/513 |
| 4,509,871 A | * | 4/1985 | Herzog | F16C 19/166 384/502 |
| 4,548,518 A | * | 10/1985 | Ravinale | D01H 7/56 384/469 |
| 6,129,456 A | * | 10/2000 | Okamoto | F16C 35/063 384/537 |
| 6,817,770 B2 | * | 11/2004 | Ishiguro | F16C 19/06 384/450 |
| 7,384,198 B2 | * | 6/2008 | Gotoh | F16C 19/06 384/490 |
| 7,448,806 B2 | * | 11/2008 | Ishiguro | F04B 27/0895 384/417 |
| 8,596,876 B2 | * | 12/2013 | Olschewski | F16C 19/28 384/569 |
| 8,858,086 B2 | * | 10/2014 | Murata | F16C 33/6681 384/462 |

FOREIGN PATENT DOCUMENTS

JP    2006-322579 A    11/2006

* cited by examiner

*Primary Examiner* — Thomas R Hannon
(74) *Attorney, Agent, or Firm* — Oliff PLC

(57) ABSTRACT

A rolling bearing includes an inner ring, an outer ring, a plurality of balls, and a cage. An annular groove for creep suppression is formed in a fitting surface of the outer ring to be fitted with a mating member (housing) to which the outer ring is to be mounted. An outer ring track groove with which the balls make rolling contact is formed in the inner peripheral surface of the outer ring on the side opposite to the fitting surface. The entire contact ellipse generated when each of the balls and the outer ring track groove contact each other is positioned within the axial range of the outer ring in which the annular groove is formed.

1 Claim, 6 Drawing Sheets

SECOND SIDE IN AXIAL DIRECTION    FIRST SIDE IN AXIAL DIRECTION

SECOND SIDE IN
AXIAL DIRECTION

FIRST SIDE IN
AXIAL DIRECTION

SECOND SIDE IN
AXIAL DIRECTION

FIRST SIDE IN
AXIAL DIRECTION

ROLLING BEARING

INCORPORATION BY REFERENCE

The disclosure of Japanese Patent Application No. 2016-206767 filed on Oct. 21, 2016 including the specification, drawings and abstract, is incorporated herein by reference in its entirety.

BACKGROUND OF THE INVENTION

1. Field of the Invention

The present invention relates to a rolling bearing.

2. Description of the Related Art

Many rolling bearings are used in various industrial devices. A rolling bearing includes an inner ring, an outer ring, a plurality of rolling elements, and a cage. The rolling elements are interposed between the inner ring and the outer ring. The cage holds the rolling elements. For example, in a rolling bearing 90 that supports a rotary shaft 99 in a housing 97, as illustrated in FIG. 5, an inner ring 91 is mounted as externally fitted on the rotary shaft 99, and an outer ring 92 is mounted to an inner peripheral surface 98 of the housing 97.

In the rolling bearing 90, the outer ring 92 and the housing 97 are occasionally assembled to each other by "clearance fitting" while the inner ring 91 and the rotary shaft 99 are assembled to each other by "interference fitting". In this case, creep (slide in the circumferential direction of the outer ring 92 with respect to the housing 97) is occasionally generated between the outer ring 92 and the housing 97 when the rotary shaft 99 is rotating.

In order to suppress generation of the creep described above, it is effective to increase the thickness of the outer ring 92, and to increase the number of balls 95 that serve as rolling elements. In such cases, however, the weight of the rolling bearing 90 may disadvantageously be increased. Thus, a rolling bearing in which an annular groove 93 is formed in an outer peripheral surface 94 of the outer ring 92 as illustrated in FIG. 5 has been proposed (see Japanese Patent Application Publication No. 2006-322579 (JP 2006-322579 A)). With the rolling bearing 90, elastic deformation of the outer ring 92 is not easily transmitted to the housing 97 even if a large load in the radial direction is applied, which makes it possible to suppress creep. Creep in which the outer ring 92 is slid slowly in the same direction as the bearing rotating direction tends to be caused in the case where such a load is applied.

As described above, it is possible to suppress creep generated in the case where a large load in the radial direction is applied, by forming the annular groove 93 in the outer peripheral surface 94 of the outer ring 92. In order to effectively suppress the creep, however, it is not clear what form of the annular groove 93 is desirable.

SUMMARY OF THE INVENTION

An object of the present invention is to further enhance the effect of an annular groove formed in a stationary ring in suppressing creep.

An aspect of the present invention provides a rolling bearing including: an inner ring; an outer ring; a plurality of balls interposed between the inner ring and the outer ring; and a cage that holds the plurality of balls, in which: one of the inner ring and the outer ring is a rotary ring, and the other is a stationary ring; an annular groove for creep suppression is formed in a fitting surface of the stationary ring to be fitted with a mating member to which the stationary ring is to be mounted, and a track groove with which the balls make rolling contact is formed in a peripheral surface of the stationary ring on a side opposite to the fitting surface; and an entire contact ellipse generated when each of the balls and the track groove contact each other is positioned within an axial range of the stationary ring in which the annular groove is formed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
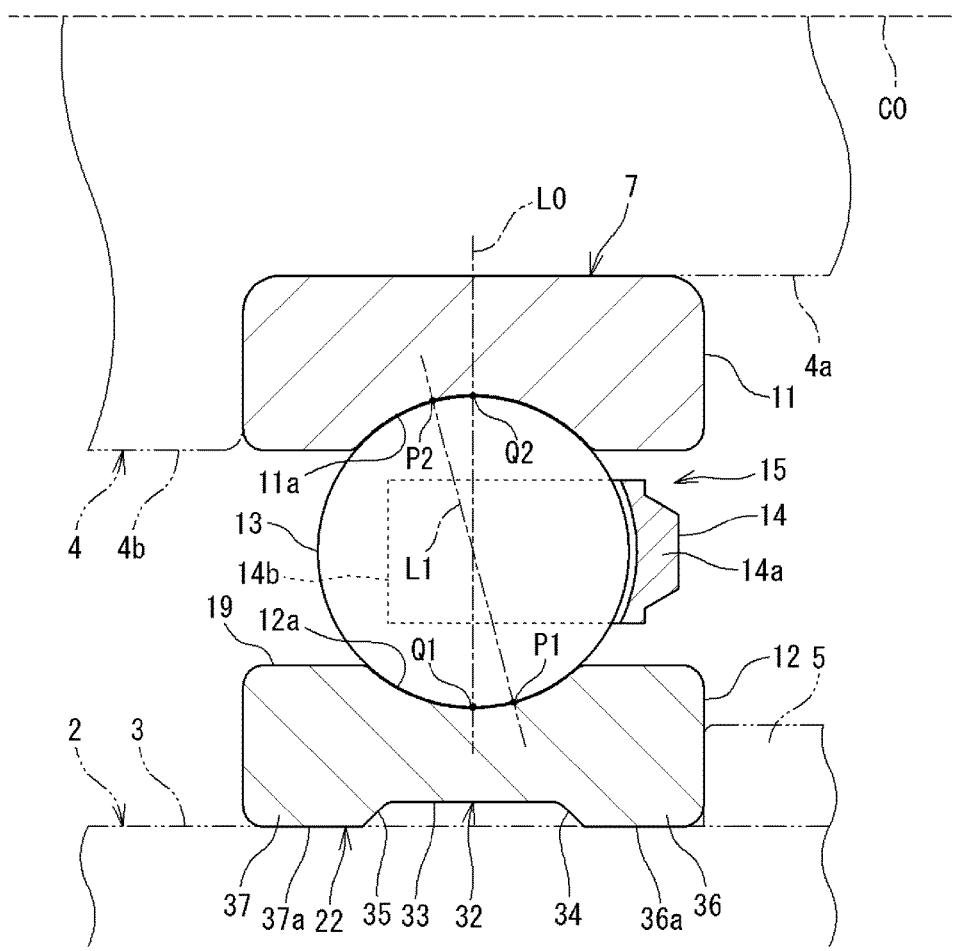
FIG. 1 is a sectional view illustrating a rolling bearing according to an embodiment of the present invention.

An embodiment of the present invention will be described below with reference to the drawings. FIG. 1 is a sectional view illustrating a rolling bearing according to an embodiment of the present invention. A rolling bearing 7 illustrated in FIG. 1 is provided in a rotary device that has a housing 2 and a rotary shaft 4, and supports the rotary shaft 4 so as to be rotatable with respect to the housing 2. The rotary shaft 4 has a small diameter shaft portion 4a and a large diameter shaft portion 4b. The rolling bearing 7 is mounted as externally fitted on the small diameter shaft portion 4a. The large diameter shaft portion 4b has an outside diameter that is larger than that of the small diameter shaft portion 4a. An inner ring 11 of the rolling bearing 7 contacts the large diameter shaft portion 4b in the axial direction. An annular portion 5 is provided on a first side, in the axial direction, of an inner peripheral surface 3 (hereinafter referred to also as a "housing inner peripheral surface 3") of the housing 2. An outer ring 12 of the rolling bearing 7 contacts the annular portion 5 in the axial direction.

The rolling bearing 7 includes the inner ring 11, the outer ring 12, a plurality of balls (rolling elements) 13, and an annular cage 14. The inner ring 11 is mounted as externally fitted on the rotary shaft 4. The outer ring 12 is mounted on the housing inner peripheral surface 3. The plurality of balls 13 are interposed between the inner ring 11 and the outer ring 12. The cage 14 holds the balls 13. The rolling bearing 7 illustrated in FIG. 1 is a deep-groove ball bearing.

With the rolling bearing 7 supporting the rotary shaft 4, a load in the radial direction acts on the rolling bearing 7. The annular portion 5 of the housing 2 can push the outer ring 12 from the first side in the axial direction toward a second side in the axial direction, and the large diameter shaft portion 4b of the rotary shaft 4 can push the inner ring 11 from the second side in the axial direction toward the first side in the axial direction. The annular portion 5, the rolling bearing 7, and the rotary shaft 4 are provided in this way. That is, a load in the axial direction is also applied to the rolling bearing 7. From the above, a combined load of the load in the radial direction and the load in the axial direction acts on the rolling bearing 7.

In the embodiment, the inner ring 11 and the rotary shaft 4 are assembled to each other by "interference fitting". The inner ring 11 is fitted in tight contact with the rotary shaft 4, and is rotatable together with the rotary shaft 4. In contrast, the outer ring 12 is mounted to the housing 2 which is stationary. The outer ring 12 is assembled to the housing inner peripheral surface 3 by "clearance fitting". Therefore, creep (slide in the circumferential direction of the outer ring 12 with respect to the housing 2) may be generated between the outer ring 12 and the housing 2 when the rotary shaft 4 is rotating together with the inner ring 11. The creep will be described again later.

An inner ring track groove (track surface) 11a that allows the balls 13 to roll is formed in the outer peripheral surface of the inner ring 11. An outer ring track groove (track surface) 12a that allows the balls 13 to roll is formed in the inner peripheral surface of the outer ring 12. The plurality of balls 13 are provided in an annular space 15 between the inner ring 11 and the outer ring 12. When the rolling bearing 7 is rotated (the inner ring 11 is rotated), the balls 13 are rolled in the inner ring track groove 11a and the outer ring track groove 12a while being held by the cage 14.

As illustrated in FIG. 1, the sectional shape of each of the inner ring track groove 11a and the outer ring track groove 12a is an arcuate shape that has a radius of curvature that is slightly larger than the radius of the balls 13. Therefore, when a load (combined load) acts on the rolling bearing 7, an elliptical contact surface is generated between each of the balls 13 and the inner ring track groove 11a and each of the balls 13 and the outer ring track groove 12a. Hereinafter, the elliptical contact surface will be referred to as a "contact ellipse".

The cage 14 can hold the plurality of balls 13 at predetermined intervals (equal intervals) along the circumferential direction. To this end, a plurality of pockets for accommodating the balls 13 are formed in the cage 14 along the circumferential direction. The cage 14 according to the embodiment has a circular portion 14a and a plurality of column portions 14b. The circular portion 14a is provided on the first side of the balls 13 in the axial direction. The column portions 14b extend toward the second side in the axial direction from the circular portion 14a. Spaces on the second side of the circular portion 14a in the axial direction and between a pair of column portions 14b and 14b that are adjacent to each other in the circumferential direction constitute the pockets. The cage 14 may be in a different form. For example, the cage 14 may also have a circular portion on the second side in the axial direction.

In the rolling bearing 7 according to the embodiment, the outer ring 12 which is a stationary ring is mounted to the housing 2 (mating member). The outer peripheral surface of the outer ring 12 constitutes a fitting surface 22 to be fitted with the housing 2 (inner peripheral surface 3). An annular groove 32 is formed in the fitting surface 22. The annular groove 32 is an annular recessed groove that is continuous in the circumferential direction. The sectional shape of the annular groove 32 is not varied but the same along the circumferential direction. In the embodiment, the annular groove 32 is provided in a region of the fitting surface 22 at the center in the axial direction. In FIG. 1 etc., the annular groove 32 is illustrated as being deep in order to facilitate illustration of the shape thereof. However, the actual depth of the annular groove 32 is significantly small compared to the thickness of the outer ring 12, and the depth of the annular groove 32 may be less than 1 mm, for example. The annular groove 32 is not in contact with the housing 2 (inner peripheral surface 3).

The outer ring 12 has cylindrical portions 36 and 37 on both sides of the annular groove 32 in the axial direction. The outer peripheral surfaces of the cylindrical portions 36 and 37 are cylindrical surfaces centered on a bearing center line C0 of the rolling bearing 7. Hereinafter, the outer peripheral surfaces of the cylindrical portions 36 and 37 will be referred to as cylindrical surfaces 36a and 37a, respectively. As illustrated in FIG. 1, the cylindrical surfaces 36a and 37a have a straight shape that is parallel to the bearing center line C0 in a sectional surface including the bearing center line C0. The cylindrical surfaces 36a and 37a can contact the housing 2 (inner peripheral surface 3).

As described above, a load in the axial direction acts on the rolling bearing 7. Therefore, in the embodiment illustrated in FIG. 1, each of the balls 13 contacts the outer ring 12 at a point P1 on the first side, in the axial direction, with respect to the deepest point Q1 of the outer ring track groove 12a. In addition, each of the balls 13 contacts the inner ring 11 at a point P2 on the second side, in the axial direction, with respect to the deepest point Q2 of the inner ring track groove 11a. In the sectional surface illustrated in FIG. 1, a line L1 that connects the point P1 and the point P2 at which each of the balls 13 contacts the outer ring 12 and the inner ring 11, respectively, is inclined with respect to a center line L0 that passes through the center of the ball 13 and that extends in the radial direction. As described above, a combined load of a load in the radial direction and a load in the axial direction acts on the rolling bearing 7. That is, the direction in which each of the balls 13 contacts the outer ring 12 and the inner ring 11 because of the combined load corresponds to the direction of the line L1 which is inclined with respect to the center line L0. The rolling bearing 7 has a contact angle.

Creep generated between the housing 2 and the outer ring 12 will be described. The following three types of creep are conceivable as being possibly generated in the rolling bearing 7. The term "bearing rotating direction" as used below indicates the rotational direction of the inner ring 11 which is a rotary ring.

First creep: creep in which the outer ring 12 slides slowly in the same direction as the bearing rotating direction Second creep: creep in which the outer ring 12 slides rapidly in the same direction as the bearing rotating direction Third creep: creep in which the outer ring 12 slides in the direction opposite to the bearing rotating direction The first creep tends to be generated in the case where a large load including a component in the radial direction is acting on the rolling bearing 7, and is considered to be generated by the following mechanism. That is, in the case where a large load including a component in the radial direction is acting on the rolling bearing 7, the balls 13 receive a high load, and pass through the outer ring track groove 12a. In this event, the outer peripheral side of the outer ring, which is directly under the balls 13, is partially elastically deformed. In the case of the rolling bearing 7 illustrated in FIG. 1, a load in the axial direction is also acting besides the large load in the radial direction. With a combined load in the direction of the line L1 acting, the outer ring 12 is elastically deformed such that the amount of distortion is large at a portion of the outer ring 12 on the radially outer side of the point P1. The balls 13 are moved along the outer ring track groove 12a. Therefore, the outer ring 12 is pulsatilely deformed (pulsatilely displaced). Consequently, the outer ring 12 would be elastically deformed (pulsatilely displaced) (in the case where the annular groove 32 were not formed), which would cause relative slide in the region of contact between the housing 2 and the outer ring 12. Such relative slide is considered to generate the first creep.

The second creep tends to be generated when the outer ring 12 is moving (sliding) in the same direction as when the first creep is generated but no load is acting on the rolling bearing 7. That is, under no load, the outer ring 12 is rotated in accompaniment with rotation of the inner ring 11, which is considered to generate the second creep.

In the third creep, the moving direction (sliding direction) of the outer ring 12 is opposite to that during the first creep and the second creep. The third creep is considered to be generated when the outer ring 12 is whirling along the housing inner peripheral surface 3 with the load in the radial direction deviating, for example.

In the rolling bearing 7 according to the embodiment, in order to suppress the first creep, the annular groove 32 is formed in the fitting surface 22 of the outer ring 12 and on the radially outer side of the outer ring track groove 12a. The annular groove 32 is formed in the fitting surface 22 of the outer ring 12 to be fitted with the housing 2 in this way. Consequently, generation of relative slide due to the elastic deformation described in relation to the mechanism for generating the first creep can be suppressed, which makes it possible to suppress the first creep. That is, in the case where a large load (combined load) including a component in the radial direction is acting on the rolling bearing 7, a region of the outer ring 12 on the radially outer side of the point P1 of the outer ring track groove 12a is elastically deformed (expanded in diameter) radially outward. Since the annular groove 32 is formed in the region, however, elastic deformation (expansion in diameter) can be caused mainly in the range of the annular groove 32. Therefore, the range in which the elastically deformed portion and the housing inner peripheral surface 3 directly contact each other can be reduced. Consequently, the elastic deformation is not transmitted (is hardly transmitted) to the housing 2, which suppresses generation of the first creep between the outer ring 12 and the housing 2. From the above, the annular groove 32 serves as a groove (clearance groove) for suppressing the first creep.

Figure 2:
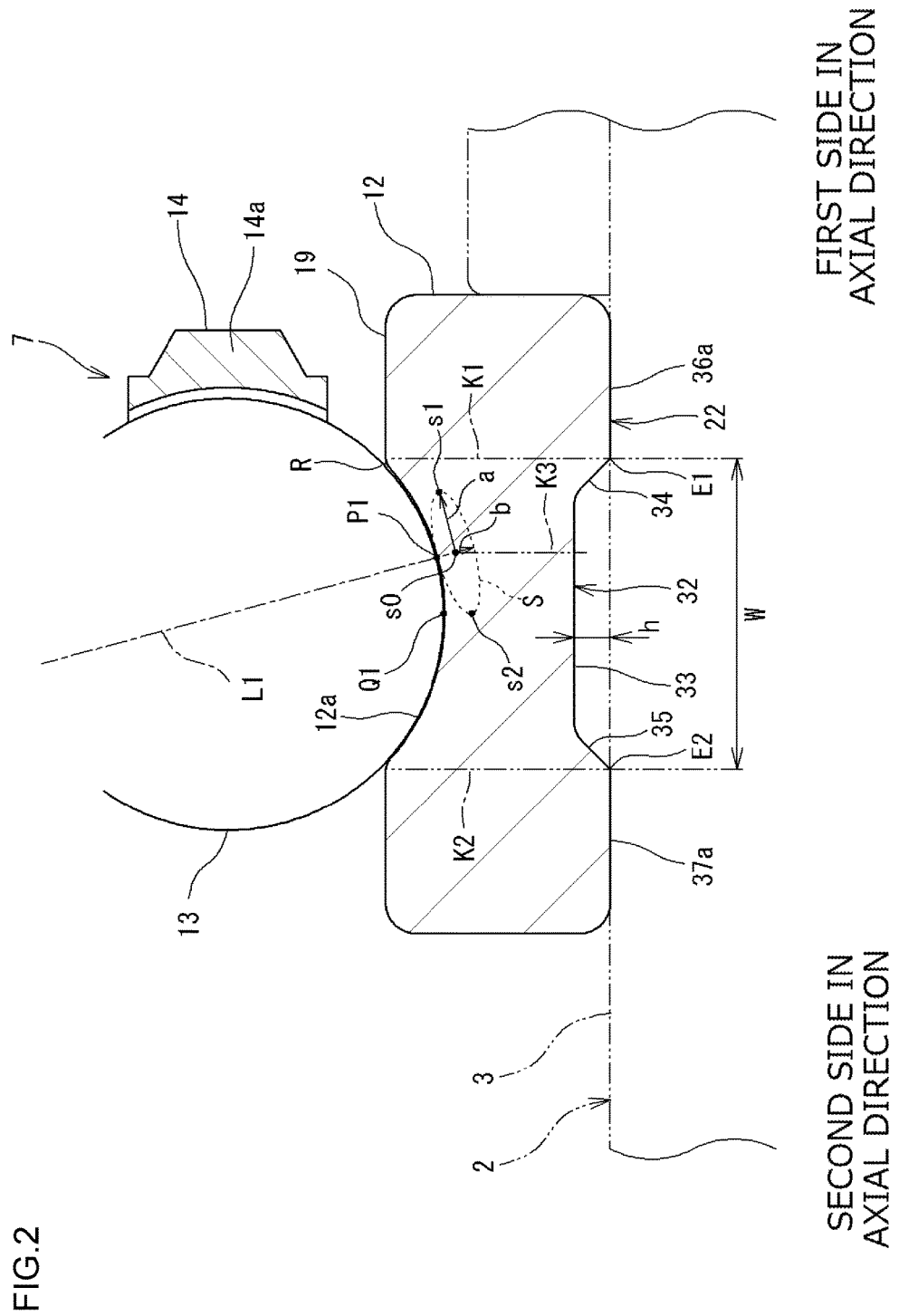
FIG. 2 is a sectional view of a ball, an outer ring, and a housing.

FIG. 2 is a sectional view of the ball 13, the outer ring 12, and the housing 2. The annular groove 32 has a cylindrical bottom portion 33 and inclined surface portions 34 and 35 positioned on both sides of the bottom portion 33 in the axial direction. The bottom portion 33 has a cylindrical surface centered on the bearing center line C0 (see FIG. 1). The inclined surface portions 34 and 35 each have a tapered surface. The bottom portion 33 has the largest groove depth h, of the annular groove 32, the groove depth h being constant along the axial direction over the bottom portion 33. The inclined surface portion 34 (35) is configured such that the groove depth becomes smaller toward a groove end E1 (E2). The intersection point between the inclined surface portion 34 on the first side in the axial direction and a cylindrical surface 36a is the groove end E1 of the annular groove 32 on the first side in the axial direction. The intersection point between the inclined surface portion 35 on the second side in the axial direction and a cylindrical surface 37a is the groove end E2 of the annular groove 32 on the second side in the axial direction. That is, the annular groove 32 lies in the range from the groove end E1 to the groove end E2. The axial range of the outer ring 12 in which the annular groove 32 is formed is indicated by an arrow W in FIG. 2. The axial range W is a range of the outer ring 12 between a first virtual plane K1 that is orthogonal to the bearing center line C0 (see FIG. 1) and that passes through the groove end (intersection point) E1 and a second virtual plane K2 that is orthogonal to the bearing center line C0 (see FIG. 1) and that passes through the groove end (intersection point) E2.

Figure 3:
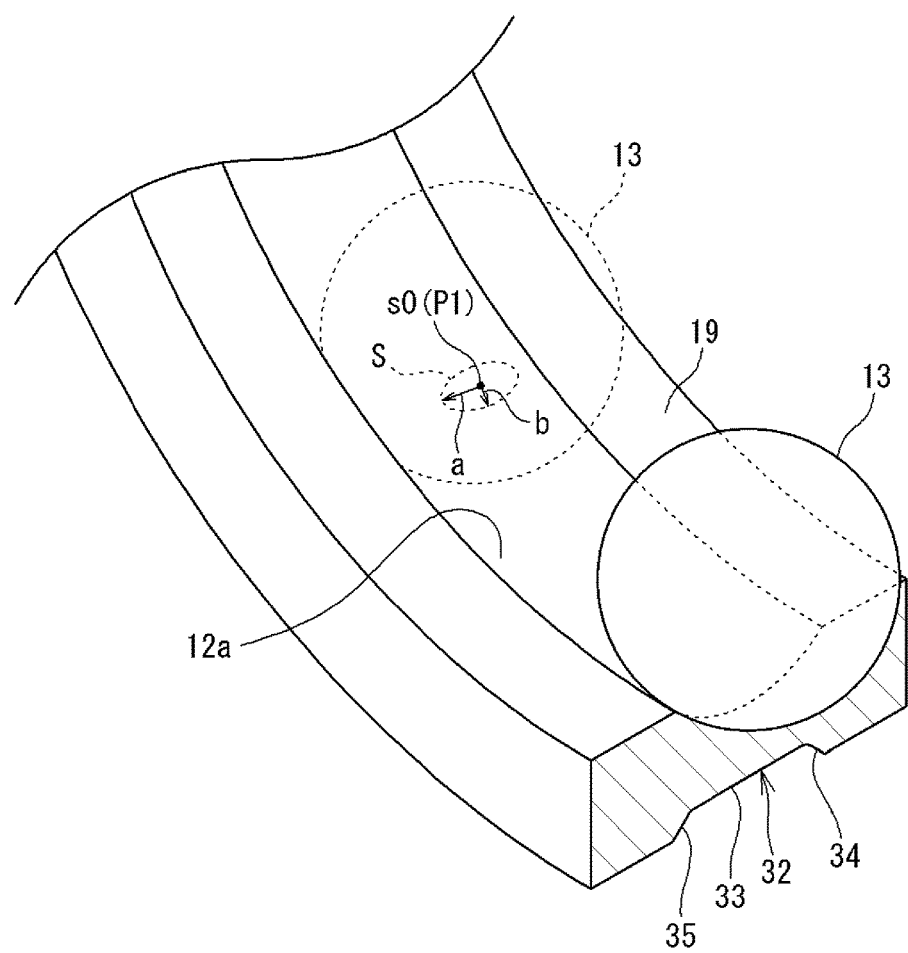
FIG. 3 is a perspective view of the ball and the outer ring.

In the embodiment, as described above, a combined load synthesized from a load in the axial direction and a load in the radial direction acts on the rolling bearing 7, and each of the balls 13 and the outer ring track groove 12a contact each other at the point P1 over an elliptical contact surface. In FIG. 2, the ellipse (contact ellipse S) of the contact is indicated by a dashed line. In reality, the contact ellipse S is formed along the recessed curved surface of the outer ring track groove 12a. In FIG. 2, however, the contact ellipse S is (simulatively) indicated in the sectional surface of the outer ring 12 for illustration. That is, in FIG. 2, the point P1 and a center s0 of the contact ellipse S are illustrated as not coinciding with each other. In reality, however, as illustrated in FIG. 3, the point P1 and the center s0 coincide with each other, and the contact ellipse S is provided between the ball 13 and the outer ring track groove 12a. The minor axis of the contact ellipse S on the recessed curved surface of the outer ring track groove 12a extends in parallel with the circumferential direction. The major axis of the contact ellipse S extends in a direction that is orthogonal to the circumferential direction.

The shape (a major radius a and a minor radius b) of the contact ellipse S is obtained from a formula according to the Hertz's theory. The shape of the contact ellipse S is obtained on the basis of the shapes and the characteristics of the outer ring track groove 12a and the balls 13. A load (contact load) in the direction along the line L1 (see FIG. 2) that acts between the outer ring track groove 12a and the balls 13 is the basic static load rating of the rolling bearing 7.

As illustrated in FIG. 2, the entire contact ellipse S is positioned within the axial range W of the outer ring 12. That is, an end portion s1 of the contact ellipse S on the first side in the axial direction is positioned on the second side in the axial direction, with respect to the groove end E1 (virtual plane K1). An end portion s2 of the contact ellipse S on the second side in the axial direction is positioned on the first side, in the axial direction, with respect to the groove end E2 (virtual plane K2).

Figure 6:
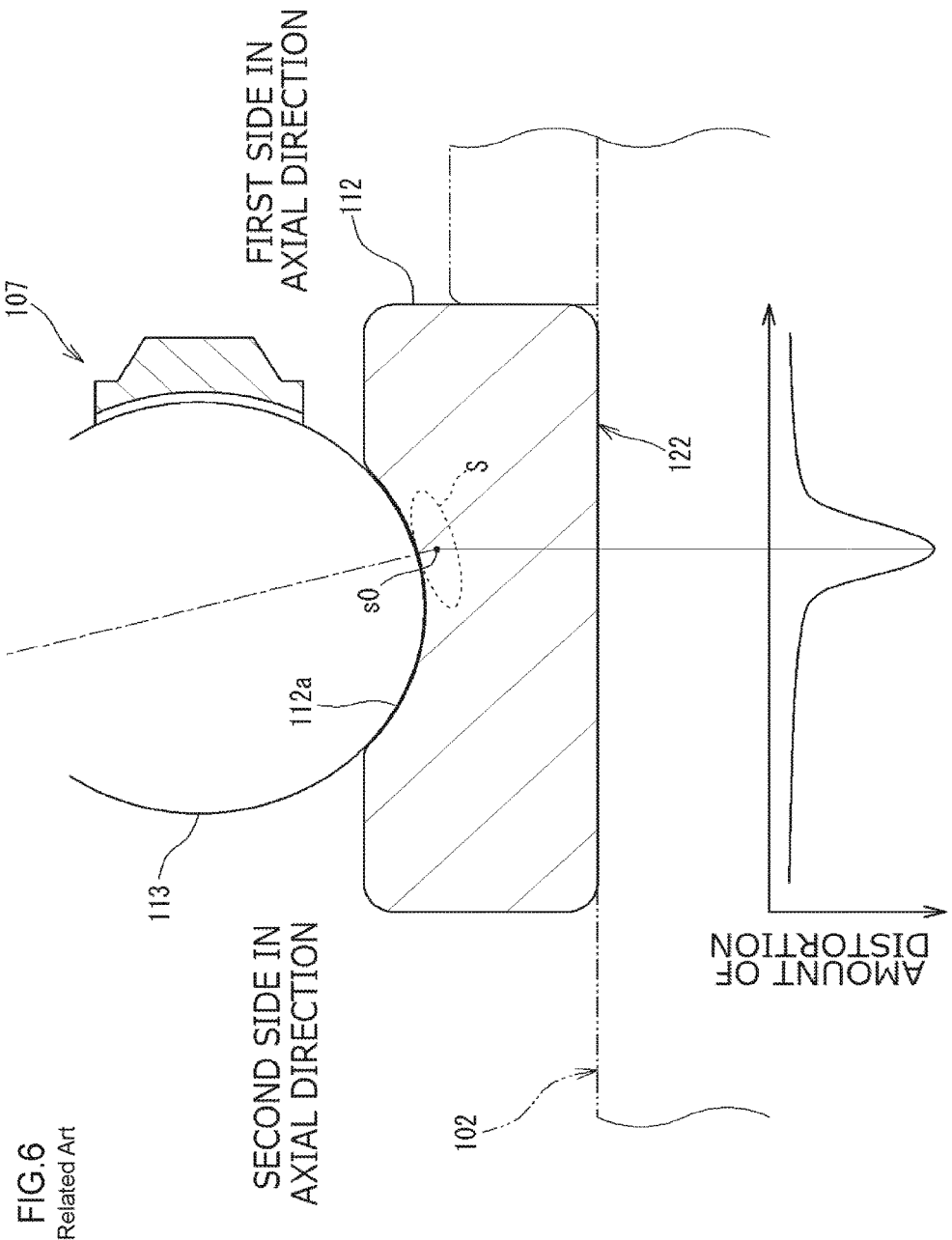
FIG. 6 illustrates a rolling bearing according to the related art in which an annular groove is not formed.

A case where an annular groove is not formed in a fitting surface 122 of an outer ring 112 will be described with reference to FIG. 6. A rolling bearing 107 illustrated in FIG. 6 differs from the rolling bearing 7 illustrated in FIGS. 1 and 2 in that the annular groove 32 is not formed in the rolling bearing 107, but is otherwise the same as the rolling bearing 7. Also in the related art illustrated in FIG. 6, an elliptical contact surface (contact ellipse S) is formed between each of balls 113 and an outer ring track groove 112a when a combined load acts. The combined load partially elastically deforms the outer ring 112 in the direction of expanding the diameter thereof. The amount of distortion is large on the outer side of the contact ellipse S in the radial direction as indicated in the graph in the lower part of FIG. 6. In particular, the amount of distortion of the outer ring 112 is largest on the outer side, in the radial direction, of the center s0 of the contact ellipse S. The first creep is generated when such elastic deformation is transmitted to the housing 102 and the balls 113 make rolling contact with the outer ring track groove 112a.

Thus, in the embodiment, as illustrated in FIG. 2, the entire contact ellipse S which is formed by contact between each of the balls 13 and the outer ring track groove 12a is positioned in the axial range W. As described above, when a large load including a component in the radial direction acts on the rolling bearing 7, large elastic deformation is generated and the amount of distortion becomes largest at a position from the contact ellipse S toward the radially outer side, of the fitting surface 22 of the outer ring 12. With the configuration described above, the annular groove 32 for creep suppression is formed at a position at which the amount of distortion becomes largest. Therefore, elastic deformation of the outer ring 12, which is caused in the annular groove 32, is not easily transmitted to the housing 2. Therefore, it is possible to further enhance the effect in suppressing the first creep of the outer ring 12.

In the embodiment, a virtual line K3 that extends radially outward from the center s0 of the contact ellipse S intersects the bottom portion 33 of the annular groove 32 at which the annular groove 32 is deepest. In the fitting surface 22 of the outer ring 12, distortion due to the elastic deformation is largest at a location directly under the center s0 of the contact ellipse S. By positioning the bottom portion 33 of the annular groove 32 at which the annular groove 32 is deepest at such a position, elastic deformation of the outer ring 12 is not easily transmitted to the housing 2.

As illustrated in FIG. 2, in the case where a load in the axial direction acts on the rolling bearing 7 besides a load in the radial direction, the contact ellipse S is positioned on the outer side in the axial direction (first side in the axial direction) with respect to the center (point Q1) of the outer ring track groove 12a in the axial direction. Thus, as described above, the annular groove 32 according to the embodiment has the bottom portion 33 which is cylindrical and which has the largest groove depth h, of the annular groove 32, the groove depth h being constant along the axial direction over the bottom portion 33. That is, the annular groove 32 has the bottom portion 33 which is wide in the axial direction and which is deep. With this configuration, the contact ellipse S is positioned as deviating toward the first side in the axial direction. The virtual line K3 which extends in the radial direction from the center s0 of the contact ellipse S intersects the bottom portion 33 of the annular groove 32 at which the annular groove 32 is deepest. As a result, elastic deformation of the outer ring 12, which is caused in the annular groove 32, is not easily transmitted to the housing 2. Consequently, it is possible to further enhance the effect in suppressing creep of the outer ring 12.

In the embodiment illustrated in FIG. 2, the bearing specifications are set such that the end portion s1 of the contact ellipse S on the first side in the axial direction is positioned on the center side, in the axial direction, with respect to an intersection point R between a shoulder portion inner peripheral surface 19 of the outer ring 12 on the first side in the axial direction and the outer ring track groove 12a in section. Rather than that, however, the bearing specifications may be set such that the end portion s1 of the contact ellipse S coincides with the intersection point R. Consequently, the balls 13 can be prevented from overriding onto the shoulder of the outer ring 12. The entire contact ellipse S is configured to be positioned within the axial range W also in the case where the end portion s1 of the contact ellipse S coincides with the intersection point R. In the case where the end portion s1 of the contact ellipse S coincides with the intersection point R, it is necessary that the annular groove 32 (at least the groove end E1) should be formed on the outer side of the intersection point R in the radial direction in order to position the entire contact ellipse S within the axial range W. That is, it is only necessary that the annular groove 32, which has a groove width that is equal to or more than that of the outer ring track groove 12a in the axial direction, should be formed in the fitting surface 22.

When a load in the radial direction acts on the rolling bearing 7, the cylindrical surfaces 36a and 37a contact the housing 2 to generate a surface pressure therebetween. In the case where the cylindrical surfaces 36a and 37a which are parallel to the housing inner peripheral surface 3 are narrow, the housing 2 is subjected to a high contact surface pressure. Therefore, the cylindrical surfaces 36a and 37a are preferably wide in the axial direction. When a low contact surface pressure acts on the housing 2, it is possible to suppress wear of the housing 2 even if some creep is generated. In particular, in the embodiment, while the outer ring 12 is made of bearing steel, the housing 2 is made of an aluminum alloy, and easily worn in a portion at a high surface pressure. However, it is possible to prevent such wear by widening the cylindrical surfaces 36a and 37a. Thus, each of the cylindrical surfaces 36a and 37a is preferably wider in the axial direction than the inclined surface portions 34 and 35 of the annular groove 32. Specifically, the axial dimension of each of the cylindrical surfaces 36a and 37a is preferably one millimeter or more, more preferably two millimeters or more, for example. If the axial dimension of the cylindrical surfaces 36a and 37a is too long, however, the annular groove 32 is narrow. Therefore, it is difficult to position the contact ellipse S within the axial range W. Thus, each of the cylindrical surfaces 36a and 37a is preferably narrower in the axial direction than half the bottom portion 33 of the annular groove 32.

As described above, the fitting surface 22 of the outer ring 12 is provided with the annular groove 32 for creep suppression and the cylindrical surfaces 36a and 37a for contact (line contact) with the housing inner peripheral surface 3. In the embodiment, however, as illustrated in FIG. 1, the axial dimension of the outer ring 12 is not larger (than the axial dimension of the inner ring 11). That is, the axial dimension of the outer ring 12 is equal to or less than the axial dimension of the inner ring 11. In the embodiment, the axial dimensions of the outer ring 12 and the inner ring 11 coincide with each other.

As described above, the rolling bearing 7 illustrated in FIGS. 1 and 2 is an invention achieved with focus on contact of the balls 13 on the outer ring 12 in which creep is occasionally generated. The annular groove 32 for creep suppression is formed in the fitting surface 22 to be fitted with the housing 2 to which the outer ring 12 is to be mounted. The outer ring track groove 12a with which the balls 13 make rolling contact is formed in the inner peripheral surface of the outer ring 12 on the side opposite to the fitting surface 22. The entire contact ellipse S, which is formed when the balls 13 and the outer ring track groove 12a contact each other, is positioned within the axial range W of the outer ring 12 in which the annular groove 32 is formed.

Figure 4:
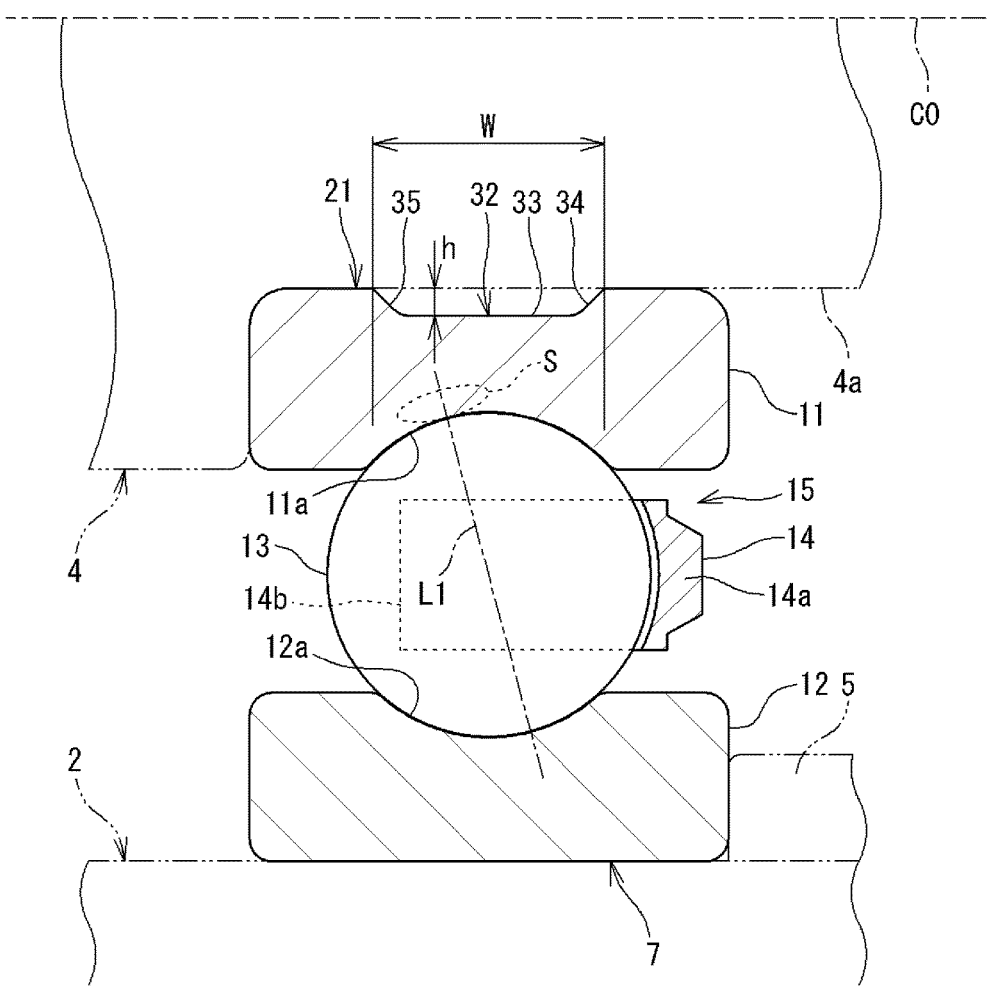
FIG. 4 is a sectional view illustrating a rolling bearing according to another embodiment.
Figure 5:
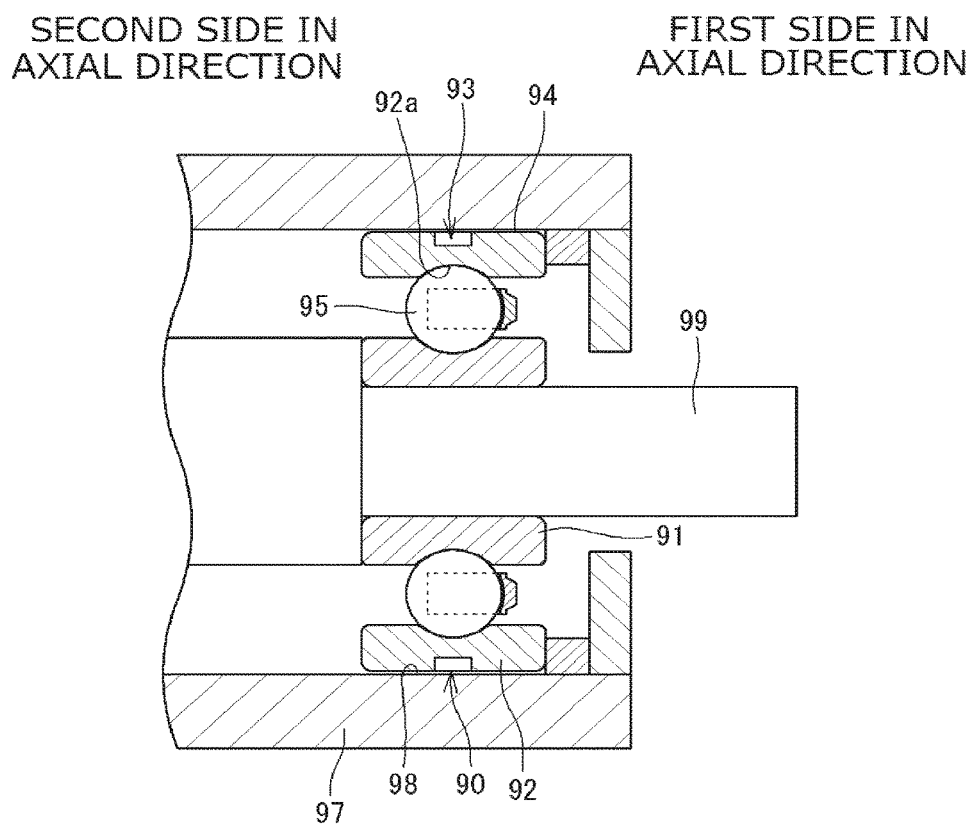
FIG. 5 is a sectional view illustrating a rolling bearing according to the related art.

In the embodiment, the inner ring 11 is a rotary ring that rotates together with a mating member (rotary shaft 4) to which the inner ring 11 is mounted, and the outer ring 12 is a stationary ring that is fixed to (but that creeps with respect to) a mating member (housing 2) to which the outer ring 12 is mounted. In the present invention, however, it is only necessary that one of the inner ring 11 and the outer ring 12 is a rotary ring and the other is a stationary ring. In contrast to the embodiment illustrated in FIG. 1, the inner ring 11 which is mounted to the shaft 4 may be a stationary ring and the outer ring 12 may be a rotary ring that rotates together with the housing 2 as illustrated in FIG. 4. In this case, the inner ring 11 and the shaft 4 are fitted with each other by clearance fitting, and the inner ring 11 creeps with respect to the shaft 4. Therefore, an annular groove 32 for creep suppression is formed in a fitting surface (inner peripheral surface) 21 of the inner ring 11 to be fitted with the shaft 4 which serves as a mating member (as in the embodiment of FIG. 1). The inner ring track groove 11a with which the balls 13 make rolling contact is formed in the outer peripheral surface of the inner ring 11 on the side opposite to the fitting surface 21. The entire contact ellipse S, which is formed when the balls 13 and the inner ring track groove 11a contact each other, is positioned within the axial range W of the inner ring 11 in which the annular groove 32 is formed. Consequently, elastic deformation of the inner ring 11, which is caused in the annular groove 32, is not easily transmitted to the shaft 4 which serves as a mating member. Therefore, it is possible to further enhance the effect in suppressing the creep of the inner ring 11. The form of the annular groove 32 described in relation to FIGS. 1 and 2 is applicable to the annular groove 32 illustrated in FIG. 4.

In the embodiments described above, as illustrated in FIGS. 1 and 4, the rolling bearing 7 including the annular groove 32 is configured to be bilaterally symmetric (symmetric between the first side and the second side in the axial direction with respect to a reference line that is orthogonal to the bearing center line C0) in section in order to eliminate the directionality of the entire rolling bearing 7 even in the case where a load in the axial direction (a component in the axial direction) is applied in only one direction. The rolling bearing 7 may not be configured to be bilaterally symmetrical, and one or both of the annular groove 32 and the cylindrical surface (36a, 37a) may be wider on the side on which the contact ellipse S is formed.

The embodiments disclosed above are exemplary in all respects, and not limiting. That is, the rolling bearing according to the present invention is not limited to the illustrated embodiments, and may be in other embodiments without departing from the scope of the present invention. For example, the annular groove 32 may be in a shape (sectional shape) other than the illustrated shape. The rolling bearing may be an angular ball bearing, rather than a deep-groove ball bearing. The rolling bearing according to the present invention is applicable to various rotary devices, and particularly suitable for rotary devices for which creep is an issue.

According to the present invention, it is possible to further enhance the effect in suppressing creep of a stationary ring since elastic deformation of the stationary ring is caused in an annular groove and not easily transmitted to a mating member.

What is claimed is:
1. A rolling bearing comprising:
an inner ring;
an outer ring;
a plurality of balls interposed between the inner ring and the outer ring; and
a cage that holds the plurality of balls, wherein:
one of the inner ring and the outer ring is a rotary ring, and the other is a stationary ring;
an annular groove for creep suppression is formed in a fitting surface of the stationary ring to be fitted with a mating member to which the stationary ring is to be mounted, and a track groove with which the balls make rolling contact is formed in a peripheral surface of the stationary ring on a side opposite to the fitting surface; and
an entire contact ellipse generated when each of the balls and the track groove contact each other is positioned within an axial range of the stationary ring in which the annular groove is formed, wherein:
a load in a radial direction and a load in an axial direction act on the rolling bearing,
a virtual line that extends in the radial direction from a center of the contact ellipse intersects a bottom portion of the annular groove at which the annular groove is deepest,
the annular groove has the bottom portion which is cylindrical and at which a groove depth is largest and constant along the axial direction, and inclined surface portions which are positioned on both sides of the bottom portion in the axial direction and in which the groove depth becomes smaller toward each groove end, and
wherein a groove width of the annular groove in the axial direction is equal to or more than a groove width of the track groove in the axial direction.

* * * * *